May 20, 1924.
J. TWARDOWSKY
DIAPHRAGM VALVE
Filed June 11, 1923
1,494,966
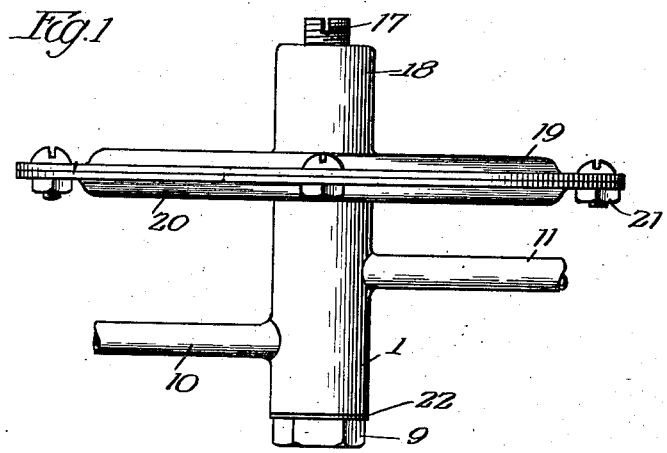
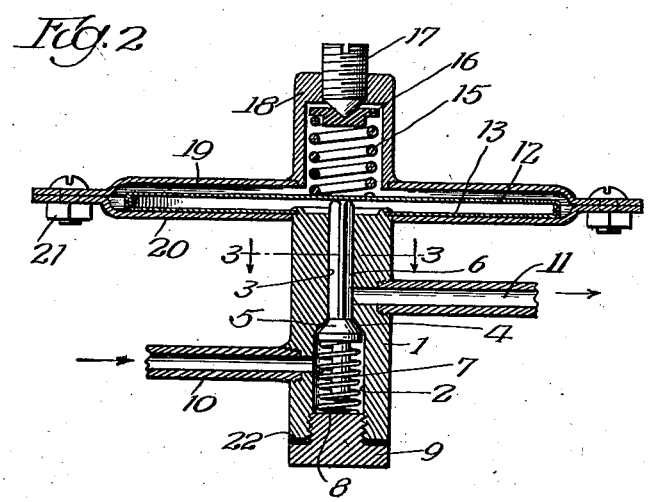
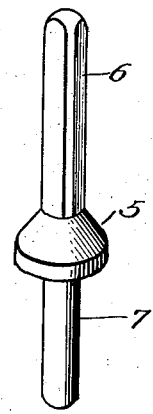
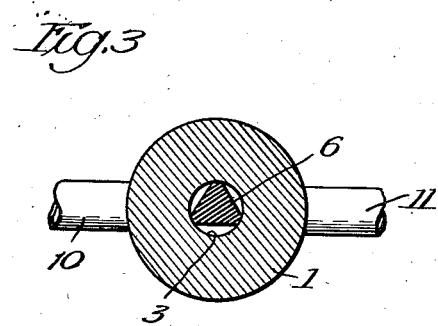
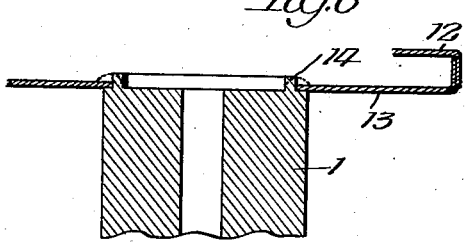
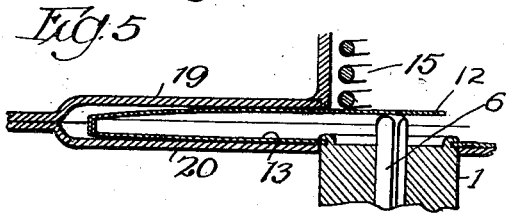
Inventor:
John Twardowsky
by Albert Scheib, Atty.

Patented May 20, 1924.

1,494,966

UNITED STATES PATENT OFFICE.

JOHN TWARDOWSKY, OF CHICAGO, ILLINOIS, ASSIGNOR, BY MESNE ASSIGNMENTS, TO UNIVERSE CORPORATION, OF CHICAGO, ILLINOIS, A CORPORATION OF ILLINOIS.

DIAPHRAGM VALVE.

Application filed June 11, 1923. Serial No. 644,817.

*To all whom it may concern:*

Be it known that I, JOHN TWARDOWSKY, citizen of Russia, residing at Chicago, in the county of Cook and State of Illinois, have invented certain new and useful Improvements in a Diaphragm Valve; and I do hereby declare the following to be a full, clear, and exact description of the invention, such as will enable others skilled in the art to which it appertains to make and use the same.

My invention relates to the general class of valves in which the extent of opening of the valve is automatically controlled in response to the pressure in one of the two duct portions between which the valve is interposed, and particularly to a valve of this class in which the control is effected by the expansion of a casing subject to the said pressure. For such general purposes, my invention aims to provide an unusually simple and easily manufactured construction, which can readily be manufactured of materials not apt to be corroded by the fluid in connection with which the valve is employed, which can readily be constructed for any desired degree of sensitiveness by merely varying the proportions of certain parts, which will not be subject to a sticking of the movable part or parts, and which can readily be adjusted with a high degree of accuracy as to the pressure at which the valve will operate.

Moreover, my invention aims to provide a pressure-controlled valve in which one portion of a casing subject to the controlling pressure acts as a diaphragm and directly controls the movement of a valve member. It also aims to provide a highly desirable valve construction for this general purpose in which the actuating parts are entirely inclosed, in which the parts can readily be assembled in such a manner as to afford a tight sealing for the portions through which the fluid passes, and in which the adjusting means are carried by a casing which also is arranged for limiting the flexing of certain of the parts so as to avoid an overstraining of these parts. Furthermore, my invention aims to provide a valve of this class in which the adjusting means also serve for holding such a combined guard and casing in its proper operative position.

More particularly, my invention provides a valve arrangement in which one wall of an expansible casing acts as a diaphragm directly engaging the stem of the movable valve member, in which this stem projects into the interior of the casing so as to engage the inner face of the casing wall which has such a diaphragm action; in which the said diaphragm wall and the movable valve member are continuously urged in opposite directions by two springs, one of which engages the outer face of the said diaphragm portions; and in which one of the springs can be readily and delicately adjusted as to its effective pressure. Still further and also more detailed objects will appear from the following specification and from the accompanying drawings, in which Fig. 1 is an elevation of an expansion valve embodying my invention.

Fig. 2 is a central and longitudinal section through the same.

Fig. 3 is an enlarged transverse section through the valve body, taken along the line 3—3 of Fig. 2.

Fig. 4 is an enlarged perspective view of the movable valve member.

Fig. 5 is a section similar to a portion of Fig. 2, but showing the diaphragm as expanded to an unusual degree, or to an extent beyond that needed for closing the valve.

Fig. 6 is an enlargement of portions of Fig. 2, showing the method of securing the expansible casing or diaphragm member to the valve body and also showing the method of securing the two parts of this member to each other.

In one of its important commercial applications, the valve of my invention is particularly suited for use as the expansion valve of a mechanical refrigerator and I am therefore illustrating and describing it in such a connection, although I do not wish to be limited as to any particular use of the same, nor as to the joint use of all of the novel features of my invention in connection with each other.

Referring to the drawings, these show a pressure-controlling valve or expansion valve having a valve body 1 provided with a central bore which comprises a lower and larger diametered bore portion 2 connected to an upper bore portion 3 by a tapering portion 4. This tapering bore portion 4 forms a seat for the upwardly tapered head portion 5 of a movable valve member which has its stem 6 slidably housed by the said upper bore portion 3 and which projects beyond the top of the valve body. Below the head 5, the movable valve member has an extension 7 affording a guide for a spiral compression spring 8, which spring bears at its upper end against the head 5 and bears at its lower end against a plug 9 screwed into the lower end of the bore 2 of the valve body. The valve body also has threaded into it an inlet pipe 10 leading to the bore portion below the valve head and an outlet pipe 11 connected to the upper or smaller bore portion 3 above the head 5. Thus arranged, it will be obvious that the connection between the inlet pipe 10 and the outlet pipe 11 is controlled by the head 5 of the movable valve member, so that this head is continuously urged towards its seat by the spring 8 but may be unseated by any thrust tending to move the said valve member downwardly.

Secured to the upper end of the valve body is an expansible casing or hollow diaphragm member which desirably consists of upper and lower disks 12 and 13 spaced from each other by a relatively short distance, these disks being provided respectively with relatively overlapping peripheral flanges as shown in Fig. 4 and the said flanges being soldered or otherwise tightly sealed to each other. The lower disk 13 of the diaphragm member has an axial perforation which desirably is of such a size as to slip snugly over an annular ring 14 formed integral with the valve body 1 at the top of the latter. During the assembling of the valve, this ring 14 is spun outwardly over the adjacent upper face of the disk 13 as shown in dotted lines in Fig. 4 and in full lines in Fig. 2, so as to clinch the lower disk 13 against the top of the valve member. The upper disk 12 is desirably imperforate and is continuously pressed downward by a compression spring 15 to which pressure may be applied through a pressure-distributing plug 16 by a screw 17 which extends coaxial with the said spring and with the movable valve member. This screw is here shown as threaded into a cap 18 which is clinched to the top 19 of a two-part casing or guard which houses the diaphragm member. The bottom 20 of the same casing is desirably secured to the upper portion 19 by bolts 21 extending through peripheral flanges on the said two casing portions. This bottom need not be secured to the valve body but may be left slidable with respect to the same, so as to be drawn upward against the bottom disk 13 of the diaphragm by the action of the spring 15 which simultaneously presses downwardly against the top 12 of the diaphragm and bodily raises the guard or casing composed of the top and bottom portions 19 and 20 and the cap 18.

With the parts thus arranged, it will be evident that the spring 15 will continuously tend to compress the diaphragm and to cause the top 12 of the latter to move the valve member downwardly against the pressure of the relatively weaker spring 8, so as to maintain a connection between the pipes 10 and 11. This connection is afforded alongside the stem of the valve member, when the latter is moved off its seat, by passages formed by the cutting away of the sides of the stem 6 of the valve member as shown in Fig. 3, while a leakage of fluid along the plug is prevented by inserting a compressible washer 22 between the head of the plug and lower end of the valve body 1.

With the parts thus arranged, the spring 8 not only urges the movable valve member continuously towards its closure position but also holds the valve stem 6 in engagement with the diaphragm top 12 as long as the valve is opened. However, a pressure within the expansible diaphragm when greater than that required for permitting the valve to be closed may flex the diaphragm top 12 upwardly out of contact with the valve stem without doing any harm. To prevent this flexing from overstraining the diaphragm, or in other words from flexing it so greatly that its inherent resiliency will not return it to its normal position when the excessive pressure is reduced, I desirably make the guard casing of stiff material and dispose its upper and lower portions so close to the expansible diaphragm that both will be engaged by the diaphragm upon an undue expansion of the latter, as shown in Fig. 5. In doing so, I employ the general principle disclosed in my copending application No. 657,268, filed Aug. 13, 1923, on a diaphragm-actuated mechanism.

In employing the valve as above described as the expansion valve of a mechanical refrigerator, I can readily adjust the pressure of the spring 15 through a manipulation of the screw 17 so that the valve will be opened to the desired extent when a quite low pressure exists in the expansion or refrigerating coil to which the outlet pipe 11 is connected. For example, I can readily cause my valve to afford the desired opening for the flow of the fluid with a back pressure of (say) one pound in the outlet pipe 11, although the pressure in the inlet pipe 10 may be very much higher. So also, by employing a diaphragm casing of ample diameter, I can secure such a sensitiveness as to cause the valve to close with a quite low rise in pressure in the outlet duct, as for example a rise of only a fraction of a pound. Owing to the sensitiveness thus secured, my invention is particularly suited for use in the form of an expansion valve having the compressible diaphragm connected to the suction side of the refrigerating system, in which the side pressure should be kept quite low so as to facilitate the rapid expansion of the previously compressed fluid.

Moreover, I can secure this sensitiveness (which is extraordinary as compared with valves of this class as heretofore in use) without introducing complications and without employing undesirably thin material. While the materials used may be greatly varied, I desirably construct the expansible diaphragm as well as the valve body 1 and the movable valve member 5 of a material which will not be corroded by the fluid employed in the refrigerating system. For example, if this fluid is sulphur dioxide, I can readily employ Monel metal for all of the parts which are exposed to the action of the fluid.

To insure a proper sealing of the parts which house the fluid, at a low manufacturing cost, I desirably provide the top of the valve body 1 with an upwardly projecting ring 14 which extends through a bore of corresponding diameter in the bottom 13 of the hollow diaphragm. Then I spin this ring downwardly over the said bottom as shown in Fig. 6 so as to clinch this bottom to the top of the valve member, this being done before the top 12 is attached. However, while I have described this as well as other desirable features of a valve embodying my invention, I do not wish to be limited to the particular details of the construction and arrangement here disclosed, as many modifications might obviously be made without departing either from the spirit of my invention or from the appended claims. So also, I do not wish to be limited to the use of all novel features of my invention in connection with each other, as certain of the same might also be employed independently of others.

Nor do I wish to be limited to any particular use of my valve, although it is particularly suited for use as the expansion valve of a refrigerating system, with the inlet pipe or port and the interior of the expansible casing continuously connected to the suction side of the compressor through the usual refrigerating coil. When thus connected the suction of the compressor continuously tends to lower the pressure within the hollow diaphragm or expansible casing and it is highly desirable that the valve should operate both with a quite low pressure on this suction side (or in the expansion coil) and with a low difference in pressure between its inlet and outlet. By having the two springs approximately balanced and by employing a hollow diaphragm of relatively large diameter, I can readily employ my valve under such conditions, as for example with a pressure of only one pound within the diaphragm and with pressure differences of less than a pound. This pressure difference is easily adjusted by means of the simple screw and the same adjustment also compensates for any differences in the tension of the springs, due to variations which occur in the ordinary manufacture of the same.

I claim as my invention:—

1. A valve comprising a relatively flat and expansible casing having an imperforate wall opposite a perforation in another wall, a valve body secured to the casing and equipped with an inlet and an outlet port, and a movable valve member slidable in the valve body and controlling the connection between the ports and normally extending through the said perforation and into engagement with the inner face of the said imperforate wall, an adjustment carrier arching around the casing, and adjustable means mounted within the carrier for urging the said imperforate wall of the casing toward the movable valve member, the adjustment carrier being slidable on the valve body and being held against sliding on the valve body by the engagement of the said adjustable means with the casing.

2. A valve comprising a relatively flat and expansible casing having an imperforate wall opposite a perforation in another wall, a valve body secured to the casing and equipped with an inlet and an outlet port, and a movable valve member slidable in the valve body and controlling the connection between the ports and normally extending through the said perforation and into engagement with the inner face of the said imperforate wall, an adjustment carrier arching around the casing, and adjustable means mounted within the carrier for urging the said imperforate wall of the casing toward the movable valve member, the adjustment carrier including a guard having one portion slidable on the valve body and another portion secured to the aforesaid portion and carrying the adjustable means, the entire carrier being movable bodily with respect to the casing by the action of the said adjustable means, the valve body having an annular extension entering the said perforation and turned outwardly over the inner face of the casing wall which has the said perforation.

3. A valve comprising a relatively flat and expansible casing having an imperforate wall opposite a perforation in another wall, a valve body secured to the casing and equipped with an inlet and an outlet port, and a movable valve member slidable in the valve body and controlling the connection between the ports and normally extending through the said perforation and into engagement with the inner face of the said imperforate wall, the valve body having an annular extension entering the said perforation and turned outwardly over the inner face of the casing wall which has the said perforation.

4. A valve comprising a body having a bore extending longitudinally thereof and a pair of lateral bores leading into the said bores and having a seat in the longitudinal bore intermediate of the lateral bores, an expansible member having a perforate wall secured to one end of the said body, a movable valve member having a head adapted to engage the seat and having a stem normally extending through the perforation in the said wall and into engagement with the opposite wall of the expansible member, spring means continuously urging the movable member towards a position in which its head engages the said seat, and means outside the expansible member for urging the said opposite wall against the said stem.

5. A valve comprising a body having a bore extending longitudinally thereof and a pair of lateral bores leading into the said bores and having a seat in the longitudinal bore intermediate of the lateral bores, an expansible member having a perforate wall secured to one end of the said body, a movable valve member having a head adapted to engage the seat and having a stem normally extending through the perforation in the said wall and into engagement with the opposite wall of the expansible member, spring means continuously urging the movable member towards a position in which its head engages the said seat, and adjustable spring means outside the expansible member for urging the said opposite wall against the said stem.

6. A valve comprising a body having a bore extending longitudinally thereof and a pair of lateral bores leading into the said bores and having a seat in the longitudinal bore intermediate of the lateral bores, an expansible member having a perforate wall secured to one end of the said body, a movable valve member having a head adapted to engage the seat and having a stem normally extending through the perforation in the said wall and into engagement with the opposite wall of the expansible member, and a pair of springs one of which engages the said stem and the other of which engages the outer face of the said opposite wall, the said springs normally cooperating in holding the said stem in engagement with the said opposite wall.

Signed at Chicago, Illinois, June 1st, 1923.

JOHN TWARDOWSKY.